June 21, 1949. W. A. CATE 2,473,785
ROTARY COMBUSTION MOTOR
Filed March 15, 1945 4 Sheets-Sheet 2

INVENTOR.
WILLIAM A. CATE
BY
Atty

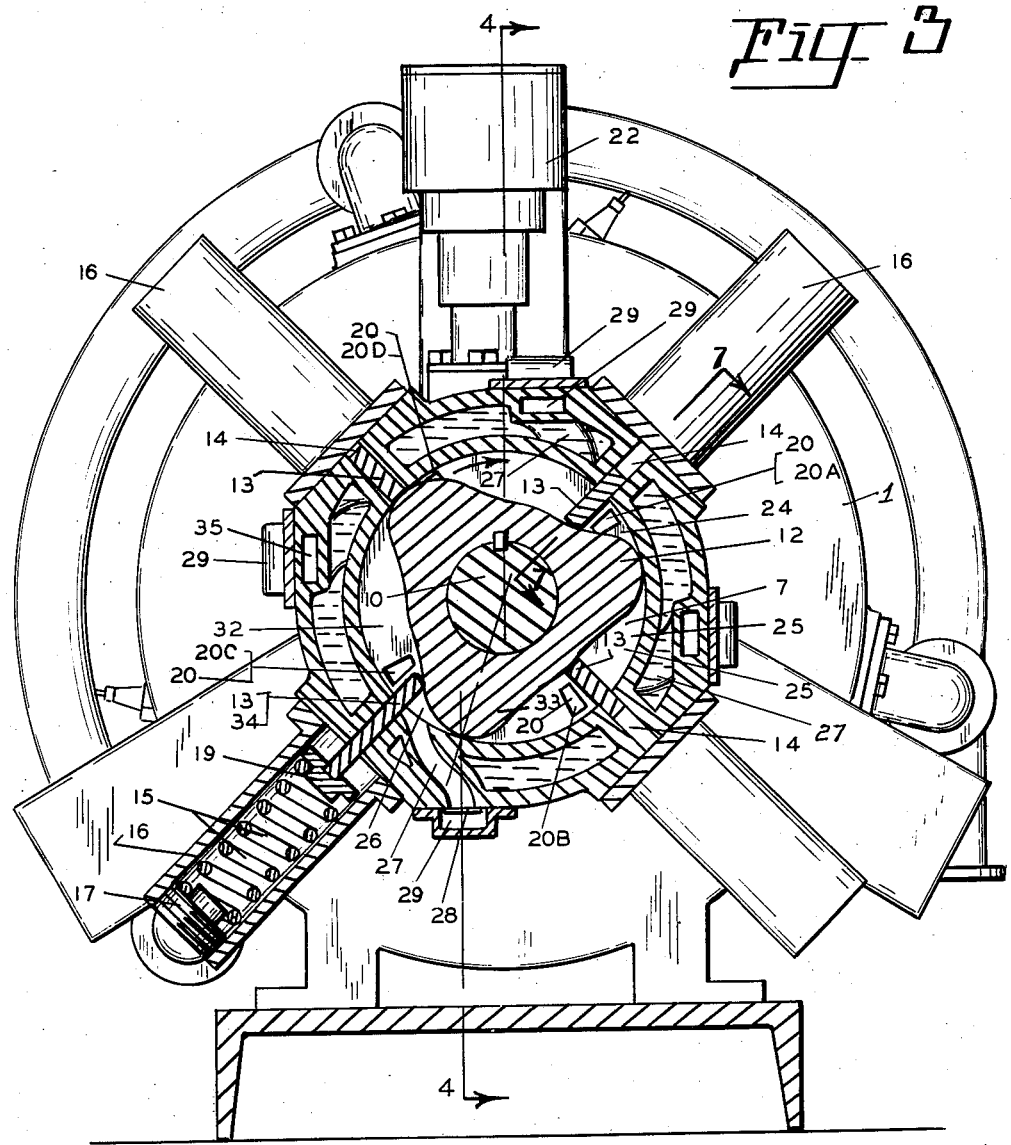

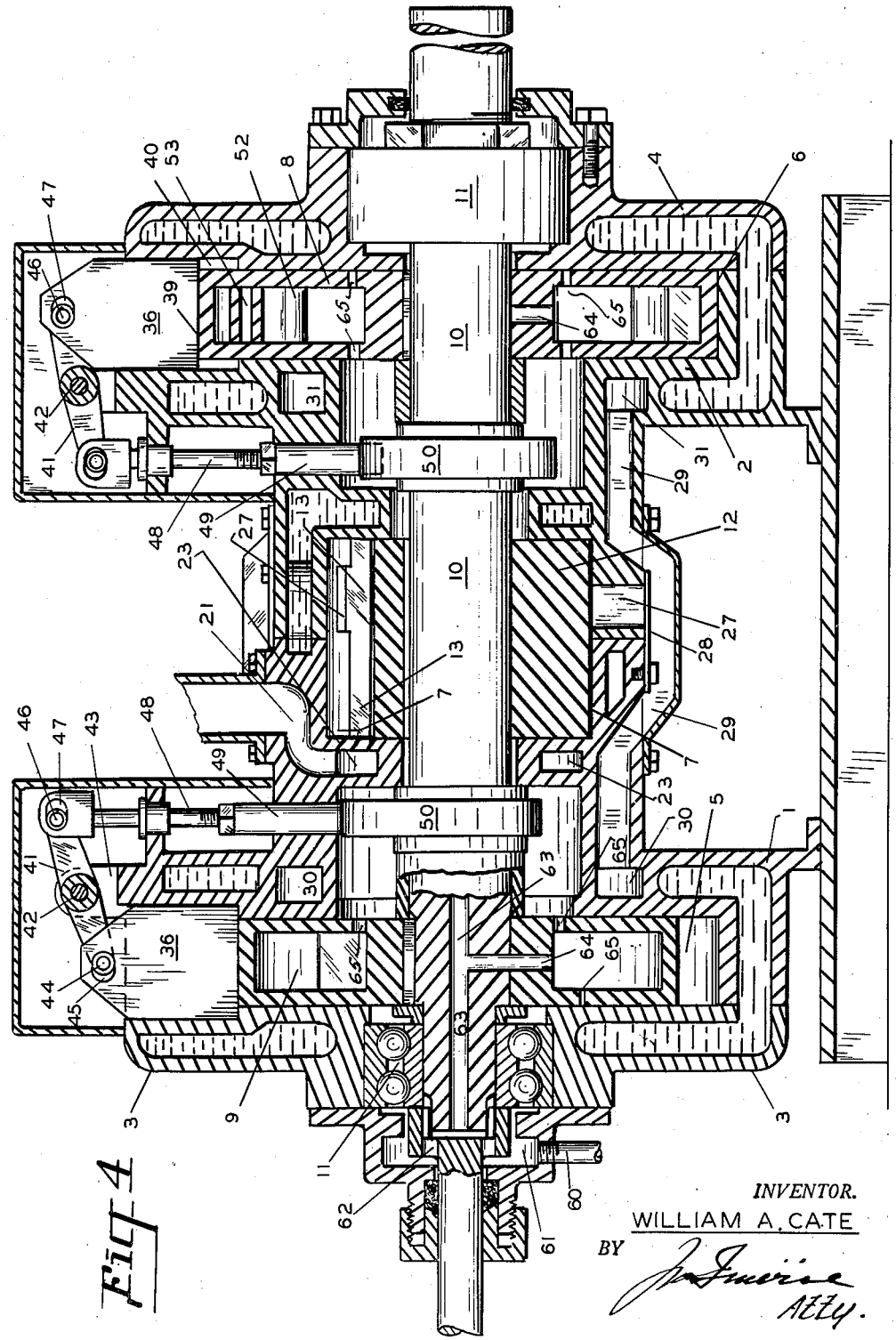

Patented June 21, 1949

2,473,785

UNITED STATES PATENT OFFICE 2,473,785

ROTARY COMBUSTION MOTOR

William A. Cate, Portland, Oreg., assignor of forty-nine per cent to Edward C. Cate, Portland, Oreg.

Application March 15, 1945, Serial No. 582,937

2 Claims. (Cl. 123—14)

This invention relates to rotary combustion engines and is particularly adapted to those burning gasoline, Diesel oil and the like.

The primary object of my invention is to provide an engine wherein are imparted power impulses to a rotor travelling in a circle within the cylinder block and having no dead center, the rotor receiving the power impulse travelling in a continuous direction and receiving a series of power impulses, eliminating considerable vibration.

Another object of the invention is to provide an engine having greater efficiency due to the fact that when the power is exerted against the rotor the power receiving heads associated with the rotor receive power impulse at right angles to the shaft upon which the rotor is mounted, thereby exerting the greatest efficiency in turning the shaft of the motor.

A further object of my invention is to provide an engine adapted for complete scavenging of the exhaust gases after each power impulse. Due to the construction of my new and improved motor the air and gases are mixed together, and compressed by a compressor forming part of the engine, but separate from the combustion cylinders. This insures a complete separation of new gases entering the combustion chambers from the old gases which have been previously and completely exhausted from the motor combustion chambers.

A still further object of my invention is to provide an engine adapted to compress the fuel by a compressor mounted on the motor shaft, said rotor of the compressor having a smaller diameter than the rotor of the motor receiving the power impulses thereby compressing the fuel to a high degree with a minimum of power required for operating the compressor.

Another object of my invention is to provide an engine having maximum power per pound of weight.

These and other incidental objects will be apparent in the drawings, specifications and claims.

Referring to the drawings:

Figure 3 is a sectional view, taken on line 3—3 of Figure 1, looking in the direction indicated and is a section through the compressor unit for mixing and compressing the air and fuel, which will be delivered to the main motor.

Figure 4 is a longitudinal sectional view, taken on line 4—4 of Figures 2 and 3.

Figure 5 is a fragmentary sectional view, taken on line 5—5 of Figure 1, looking in the direction indicated, illustrating the rotor having moved to the point for receiving the fuel from the compressor.

Figure 6 is a fragmentary sectional view taken on line 6—6 of Figure 5, illustrating the ports and manifolds.

In the drawings:

Figure 1:
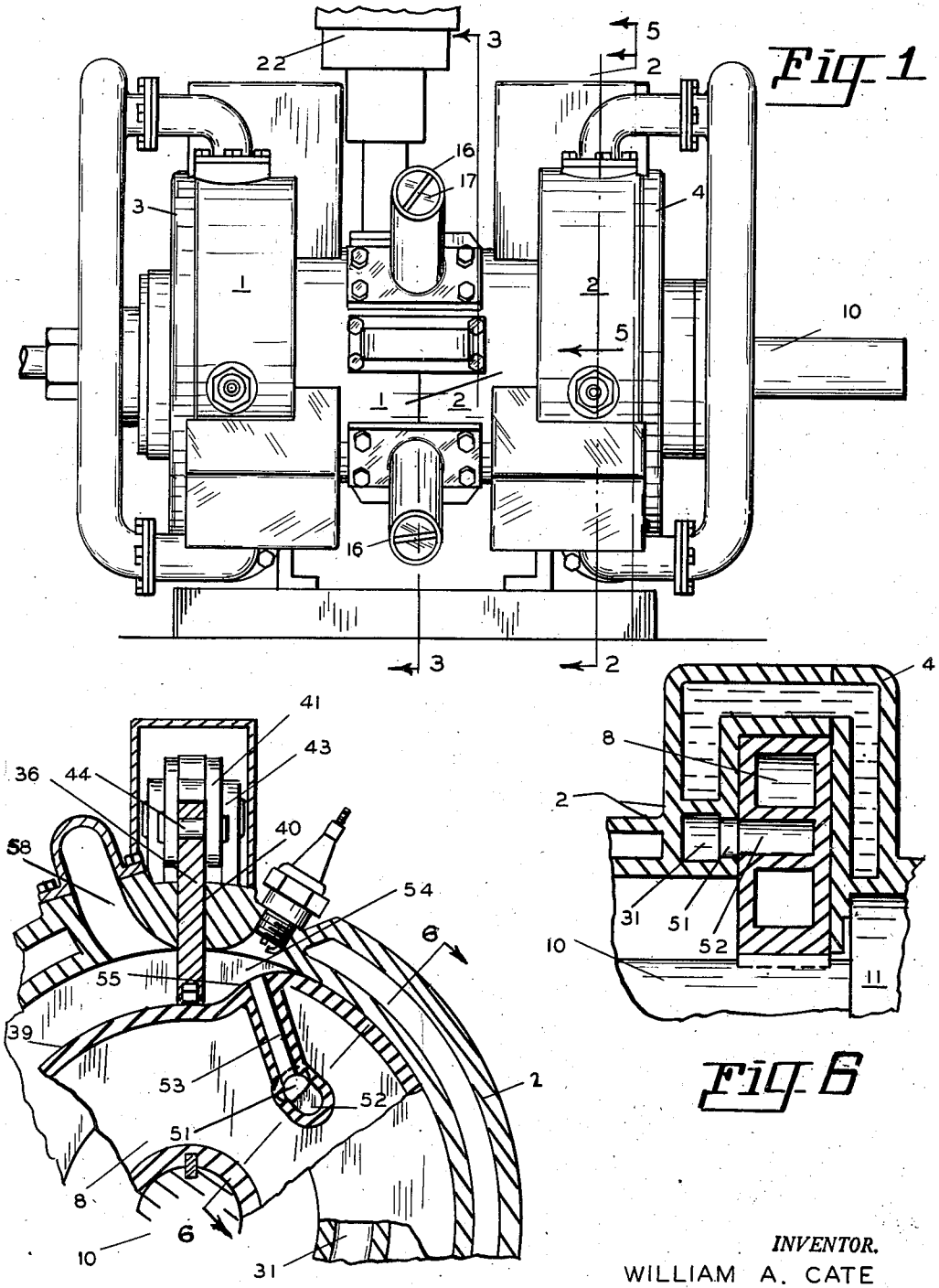
Figure 1 is a side elevation of my new and improved rotary motor.

My new and improved engine consists of cylinder blocks 1 and 2, having cylinder heads 3 and 4 mounted together as a single unit as shown in Fig. 1. The cylinder chambers 5 and 6 form the combustion chambers, while the cylinder chamber 7 forms the compressor cylinder as shown in Fig. 4. Rotors 8 and 9 are keyed to the shaft 10 running longitudinal of the cylinder assemblies. The shaft 10 is mounted within suitable bearings 11, which are mounted within the cylinder heads 3 and 4. The compressor rotor 12 is also keyed to the shaft 10 and revolves therewith.

I will first describe the operation of the compressor unit referring to Fig. 3. Movable compression heads 13, which may be in the form of vanes, are arranged radially about the compressor rotor 12 and within the cylinder compression chamber 7. These compression heads or vanes are slidable within suitable guides 14, which may be formed as part of the cylinder casting and are maintained against the rotor by springs 15 mounted within the caps 16, said springs having their outer ends bearing against the adjustable stop 17 and resting on the extension 18 of the vane or cylinder head 13 at 19 on their inner ends. The stops 17 are adjustable and can be changed to vary the pressure applied to the cylinder head 13 against the rotor 12, depending upon the running conditions of the motor. Intake ports 20 communicate with an annular manifold 23 and the compression chamber 7. The manifold 23 receives fuel from the carburetor 22 through the port 21.

Referring to Figure 3, it will be noted that the rotor 12 travels in the direction of the arrow and this movement causes suction within the spaces 24, thereby drawing fuel through the ports 20A, 20B and 20C, but that this action has not yet started with respect to the port 20D according to the position of the rotor 12 in Fig. 3. It will be noted also that the movement of the rotor 12, in the position shown, causes a compression within the spaces 25 and 26. This forces the fuel previously taken in through the ports 20, out through ports 27, through the spring valve 28 and into the manifold 29. The manifold 29 is formed within the cylinder blocks and communicates with the annular manifolds 30 and 31, shown in Fig. 4. The pressure of the fuel is maintained within the manifolds 30 and 31 until allowed to enter the compression cylinders 1 and 2.

Referring to Fig. 3, in the cylinder space 32, in the compression chamber 7, the end of the intake from the port 20C is almost completed and as the lobe 33 of the rotor passes under the compression head 34 it will begin to compress the fuel within the space 32, at the same time forcing it out through the port 35 into the manifold 29, thence to the annular manifolds 30 and 31. It will be noted that there are four compression strokes in one complete revolution of the rotor 12, although I do not wish to be limited to any special number of compression strokes.

Figure 2:
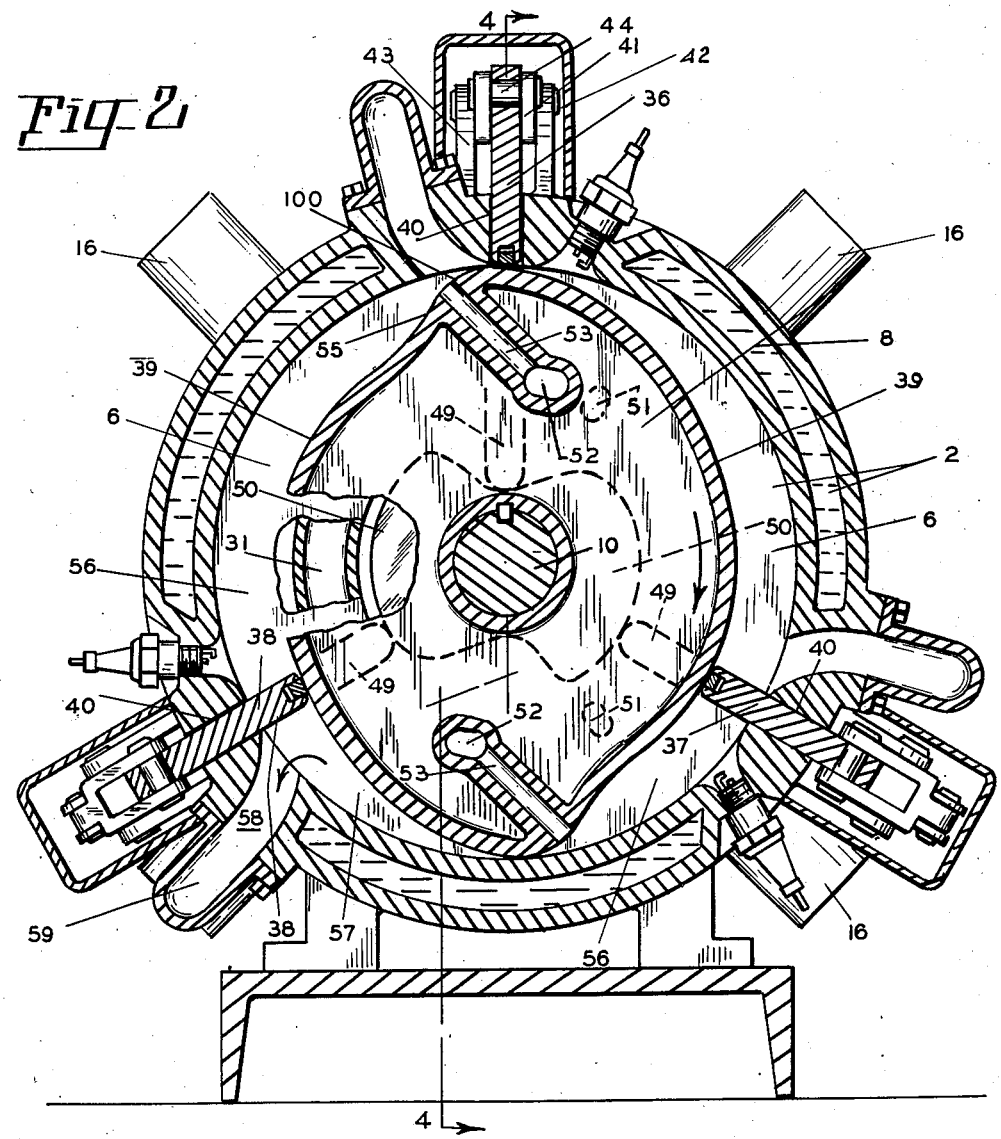
Figure 2 is an end sectional view of my new and improved motor, taken on line 2—2 of Figure 1, looking in the direction indicated. This section is taken through the combustion chambers, together with the rotor and associated parts.
Figure 7:
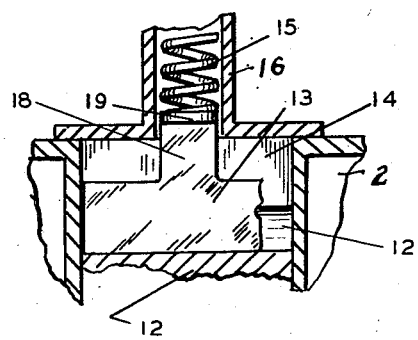
Figure 7 is a fragmentary sectional view taken on line 7—7 of Figure 3, through another of the compression heads of the compressor.

I will now describe the operation of the power rotors 8 and 9 within the cylinders 5 and 6. Referring to Fig. 2, I have illustrated the construction of the cylinder 6 and the rotor 8 which is illustrative of both of the cylinders and rotors. According to this construction, three movable combustion heads 36, 37 and 38 working against the surface 39 of the rotor 8. These movable combustion heads work within guides 40 and are caused to follow the surface 39 of the rotor 8 by positive action. As best shown in Fig. 4 rocker arms 41 are pivotally mounted at 42 to the upright lugs 43 forming part of the cylinder casting. One end of each of rocker arms 41 has a cross pin 44 working within a slot 45 of one of the combustion heads 36, 37 and 38. The opposite end of each of the rocker arms has a cross pin 46 working within a slot 47 on the upper end of the push rod 48. The lower end 49 of the push rod 48 rides on the cam 50. The cam 50 is keyed to the shaft 10 and is so designed as to cause the rocker arm assembly to maintain the combustion heads against the surface 39 as the rotor is revolved. In Figure 2, the operating cam 50 is shown by dotted lines.

I will now describe the operation of the motor. Referring to Figure 5, the rotor 8 is shown in an advanced position from that shown in Figure 2. The rotor is shown in a position to receive a charge of fuel from the port 51, which registers with the annular manifold 31, as heretofore described. Fuel rushes through the port 51 from the manifold 31, which, as stated before, is under constant fuel pressure. The fuel then enters the cross manifold 52 within the rotor and thence through the ports 53 into the combustion chamber 54 at which time it is ignited. As the rotor turns the port 51 is closed and the expansion takes place against the combustion head 36 and the surface 55 of the rotor, forcing the rotor around in the direction of the arrow.

Referring now to Figure 2, it will be noted that, according to the position shown, expansion is taking place in space 56 and that within space 57 exhaust gases are being expelled therefrom through the exhaust port 58 and out the manifold 59. The combustion head 38 deflects the exhaust gases within the space 57 out through the port 58 until the lobe 99 of the rotor passes the port 58 as is the case of the lobe 100 at the upper portion of Figure 2. This is an important feature of my new engine, insuring complete scavenging of burned gases from the firing chambers after the power has been extracted therefrom.

I will now describe the complete cycle of operation. As the compression rotor 12 revolves, gases are taken in through the ports 20 from the carburetor 22 together with the proper air mixture. This mixture is compressed and delivered through the ports 27 into the manifolds 29 to the annular manifolds 30 and 31 of the motor blocks 1 and 2. Next, it is released through the ports 51 into the manifolds 52 of the rotors 8 and 9 and delivered into the combustion chambers 54 and ignited, driving the rotor 8 in the direction of the arrow due to the expansion of gases against the combustion heads 36, 37 or 38 and surfaces 55 of the lobes 99 and 100 the rotors 8 and 9. As the rotor travels further the cam surface 39 will raise the combustion head at the same time decreasing the area within the combustion chamber and forcing out the exhaust gases as heretofore described from the space 57.

I have illustrated a cooling jacket surrounding my motor, which may be of the conventional form. Referring to Figure 4, the rotors themselves may be lubricated and cooled by a supply of cooling medium entering the motor block by way of the supply line 60. This cooling and lubricating liquid leads from the manifold 61 through the ports 62 and into the core 63 of the shaft 10 and out the rotors. Outlets 65 allows the lubricating and cooling medium to circulate through the motor.

I do not wish to be limited to the exact mechanical construction as illustrated, as other forms of mechanical equivalents may be used still coming within the scope of my claims.

I claim:

1. A rotary internal combustion engine comprising in combination, a casing, two power cylinders and a compression cylinder axially aligned in said casing, said compression cylinder being between said power cylinder and having an outlet peripherally thereof and externally of said casing, a shaft mounted in said casing axially of said cylinders, rotors mounted in each of said cylinders and secured to said shaft, abutment members movably mounted in each of said cylinders to cooperate with the respective rotors mounted therein, ignition means in said power cylinders for firing fuel therein to drive the respective rotors therein, a fuel manifold encircling said shaft within said casing laterally adjacent said compression cylinder and having communication therewith through a common wall, supply manifolds in said casing respectively between said power cylinders and said compression cylinder, said supply manifolds respectively having communication with said power cylinders and having inlets opening externally of said casing on either side of said compression outlet, and a compression manifold in the form of a hood mounted on said casing and connecting said compression cylinder outlet and said supply manifold inlets.

2. An engine as defined in claim 1 wherein means for moving said power cylinder abutment members in timed relation to the rotation of the power cylinder are operatively connected with said shaft within cavities within said casing, said cavities being centrally of said supply manifolds and between said power cylinders and said fuel manifold and compression cylinder respectively.

WILLIAM A. CATE.

REFERENCES CITED

The following references are of record in the file of this patent:

UNITED STATES PATENTS

| Number | Name | Date |
|---|---|---|
| 913,635 | Friend | Feb. 23, 1909 |
| 953,206 | King | Mar. 29, 1910 |
| 955,155 | Green | Apr. 19, 1910 |
| 1,135,648 | Ahlm | Apr. 13, 1915 |
| 1,235,786 | Fleming | Aug. 7, 1917 |
| 1,280,915 | Weidenbach | Oct. 8, 1918 |
| 1,838,477 | Elsea | Dec. 29, 1931 |
| 1,970,003 | Fenati | Aug. 13, 1934 |
| 1,986,435 | Heinze | Jan. 1, 1935 |
| 2,028,603 | Heinze | Jan. 21, 1936 |
| 2,040,036 | Weeks | May 5, 1936 |
| 2,175,265 | Johnson | Oct. 10, 1939 |
| 2,280,742 | Bowers | Apr. 21, 1942 |
| 2,366,213 | Pover | Jan. 2, 1945 |